United States Patent [19]
Kato et al.

[11] Patent Number: 5,124,974
[45] Date of Patent: Jun. 23, 1992

[54] MECHANISM FOR ADJUSTING THE POSITION OF PICKUP IN A DISC PLAYER

[75] Inventors: Kyoichi Kato; Takashi Suzuki, both of Saitama, Japan

[73] Assignee: Pioneer Electronic Corporation, Tokyo, Japan

[21] Appl. No.: 479,820

[22] Filed: Feb. 13, 1990

[30] Foreign Application Priority Data

Mar. 6, 1989 [JP] Japan ................. 1-52121
Mar. 6, 1989 [JP] Japan ................. 1-52122

[51] Int. Cl.⁵ .................. G11B 5/56; G11B 21/24; G11B 3/10
[52] U.S. Cl. .................. 369/256; 369/215; 369/249; 360/109
[58] Field of Search .......... 369/256, 254, 215, 249, 369/253; 360/109, 105, 106

[56] References Cited

U.S. PATENT DOCUMENTS

| | | | |
|---|---|---|---|
| 4,268,881 | 5/1981 | Saito | 360/109 |
| 4,314,296 | 2/1982 | Whittle | 360/109 |
| 4,835,642 | 5/1989 | Furukawa et al. | 360/105 |
| 4,872,077 | 10/1989 | Tezuka | 360/109 |
| 4,947,481 | 8/1990 | Ikedo et al. | 369/215 |

Primary Examiner—Stuart S. Levy
Assistant Examiner—Joseph A. Rhoa
Attorney, Agent, or Firm—Sughrue, Mion, Zinn, Macpeak & Seas

[57] ABSTRACT

A mechanism for adjusting the position of a pickup used in a disc player. The mechanism includes a slider which is driven along a path in the radial direction of a turntable. The slider has a projection which serves as the origin of angular movement. An adjustment plate is mounted on the slider and has the pickup mounted thereon. The adjustment plate is movable in a direction perpendicular to the radial direction of the turntable. A plurality of tension springs are provided between the slider and the adjustment plate to bias the plate against one of a plurality of side walls of the slider. The tension springs further bias a lower surface of the adjustment plate against the projection. In this manner, the optical axis of an objective lens of the pickup passes through the origin of angular movement. A tracking adjustment device is mounted on the slider for angularly moving the adjustment plate to adjust the inclination of the pickup in a tracking direction. A tangential adjustment device is mounted on the slider for angularly moving the adjustment plate to adjust the inclination of the pickup in a tangential direction. Further, a centering adjustment device is provided on the one side wall for moving the adjustment plate to adjust the centering of the pickup.

9 Claims, 9 Drawing Sheets

MECHANISM FOR ADJUSTING THE POSITION OF PICKUP IN A DISC PLAYER

BACKGROUND OF THE INVENTION

The present invention relates to a mechanism for adjusting the position of a pickup used in a player for reproducing information recorded in a disc such as a digital audio disc (CD) and a laser video disc (LD). In order to precisely reproduce the information recorded in a disc with a player, it is necessary to precisely determine the inclination of a pickup in both a tracking direction and a tangential direction and to control the pickup by means of a servo mechanism. Further, it is necessary that the center of a pickup, that is, the optical axis of an objective lens, be aligned with a plane which extends in the axial direction of a turntable and which includes a path extending in the radial direction of the turntable disposed parallel to the straight line movement of a slider which supports the pickup.

FIG. 9 is a perspective view of a conventional mechanism for adjusting the inclination of a pickup of a player, and FIG. 10 is an exploded perspective view of the mechanism of FIG. 9.

In FIGS. 9 and 10, a spindle motor 1 is mounted on a chassis (not shown), and a turntable 2 is mounted on a rotatable spindle of the spindle motor 1. A disc is adapted to be placed on the turntable 2.

A slider 3 is driven by a linear motor (not shown) for movement in the radial direction of the turntable 2, that is, in an X-axis direction, along guide bars (not shown). The slider includes a bottom wall 3a, a block 3b mounted on one side edge portion of the bottom wall 3a and extending in a direction of a Y-axis perpendicular to the X-axis, and first through third side walls 3c-3e formed respectively on three sides of the bottom wall 3a.

The bottom wall 3a has a threaded hole 3a in which a threaded portion of a first adjustment screw 10 (described later) is threaded. The block 3b has a hole $3b_1$ in which a pivot pin 6, mounted on a lever 4 (described later), is angularly movably received, a recess $3b_2$ in which part of a round rod 8 (described later) and a first spring 9 are received, and threaded holes $3b_3$ and $3b_4$ in which a second adjustment screw 14 (described later) and a screw 13 for mounting a second leaf spring 12 are respectively threaded.

The first side wall 3c disposed in opposed relation to the block 3b has a recess $3c_1$ into which one end of the round rod 8 is urged to be received, and a projection $3c_2$ which holds a pickup 7 (described later) apart from the first side wall 3c by a predetermined distance.

A straight line interconnecting the center of the recess $3b_2$, formed in the block 3b, and the center of the recess $3c_1$, formed in the first side wall 3c, is substantially parallel to the X-axis.

The lever 4 includes a first flat portion 4a having an abutment portion $4a_1$ abutting against the lower surface of the pickup 7, a vertical portion 4b extending from the first flat portion 4a, and a second flat portion 4c formed at one end of the vertical portion 4b on the side opposite to the first flat portion 4a. The second flat portion 4c has a hole $4c_1$ through which the threaded portion of the first adjustment screw 10 passes, with the head of the screw held against the second flat portion 4c.

A first leaf spring 5 is mounted on the first flat portion 4a of the lever 4, and has a first spring portion 5a for upwardly urging the lower surface of the pickup 7 at the side opposite to the abutment portion $4a_1$ of the lever 4, and a second spring portion 5b for urging the pickup 7 toward the first side wall 3c of the slider 3.

The pivot pin 6 is mounted on the outer surface of the vertical portion 4b of the lever 4, and is angularly movably received in the hole $3b_1$ formed through the block 3b of the slider 3.

An objective lens 7a, which is driven for movement in the upward and downward directions, is mounted on the upper side of the pickup 7, and the pickup 7 has a hole 7b formed therethrough and extending in the X-axis direction. The round rod 8 is angularly movably received in the hole 7b.

Therefore, the optical axis of the objective lens 7a is offset from the center line of the hole 7b by an amount of $y_0$ in the Y-axis direction.

The round rod 8 is conical at one end thereof, and extends through the hole 7b in the pickup 7 and is received at the one end thereof in the recess $3c_1$ in the first side wall 3c of the slider 3. The other end of the round rod 8 is received in the recess $3b_2$ in the block 3b, and the round rod 8 is pivotally movable about the one end thereof received in the recess $3c_1$.

Therefore, the optical axis of the objective lens 7a of the pickup 7 is offset from the center of pivotal movement of the round rod 8 by an amount of $x_0$ in the X-axis direction.

The first spring 9 is provided in the recess $3b_2$ formed in the block 3b of the slider 3, and urges the other end of the round rod 8 upwardly.

The first adjustment screw 10 serves to adjust the inclination of the pickup 7 in the tangential direction. The head of this screw abuts against the second flat portion 4c of the lever 4, and its threaded portion passes through the hole $4c_1$ of the second flat portion 4c and a second spring 11 and is threaded into the threaded hole $3a_1$ formed in the bottom wall 3a of the slider 3. The second spring 11 urges the second flat portion 4c upwardly.

The second leaf spring 12 is mounted to the block 3b of the slider 3 by the screw 13, and includes a first spring portion 12a for urging the other end of the round rod 8 downwardly, and a second spring portion 12b for urging the round rod 8 toward the first side wall 3c of the slider 3.

Formed through the first portion 12a is a slot $12a_1$ through which the threaded portion of the second adjustment screw 14 extends.

The second adjustment screw 14 serves to adjust the inclination of the pickup 7 in the tracking direction. Its head is held against the first spring portion 12a of the second leaf spring 12, and its threaded portion passes through the slot $12a_1$ of the second leaf spring 12 and is threaded into the threaded hole $3b_3$ formed in the block 3b of the slider 3.

The operation will now be described.

First, when the inclination of the pickup 7 in the tracking direction is to be adjusted, the second adjustment screw 14 is angularly moved, so that the round rod 8 is pivotally moved about the recess $3c_1$ formed in the first side wall 3c of the slider 3. Therefore, the inclination of the pickup 7 in the tracking direction can be adjusted by adjusting the second adjustment screw 14.

When the inclination of the pickup 7 in the tangential direction is to be adjusted, the first adjustment screw 10 is angularly moved to angularly move the lever 4 about the pivot pin 6. At this time, because of the provision of the round rod 8, the pickup 7 is angularly moved about the round rod 8. Therefore, the inclination of the pickup 7 in the tangential direction can be adjusted by adjusting the first adjustment screw 10.

In the conventional mechanism for adjusting the inclination of a pickup having the above construction, when the inclination of the pickup 7 in the tracking direction is to be adjusted, the pickup 7 is angularly moved about the portion of the round rod 8 held against the first side wall 3c. When the inclination of the pickup 7 in the tangential direction is to be adjusted, the pickup 7 is angularly moved about the round rod 8.

Therefore, the origin of adjustment of the inclination of the pickup 7 in the tracking and tangential directions is the portion of the round rod 8 held against the first side wall 3c.

The portion of the round rod 8 held against the first side wall 3c is offset from the optical axis of the objective lens 7a of the pickup 7 by an amount of $x_0$ in the X-axis direction and also by an amount of $y_0$ in the Y-axis direction. Therefore, when at least one of the inclinations of the pickup 7 in the tracking and tangential directions is adjusted, the height of the pickup 7 is changed. It is cumbersome to adjust the inclination of the pickup 7 in the tracking and/or tangential directions while suitably adjusting the height of the pickup, and this is disadvantageous in that much time is required for the adjustment operation.

Further, in the conventional device, when the centering of the pickup is to be adjusted, a slider drive mechanism for driving the slider is fixed to a chassis. Thus, in this condition a spindle motor to which the turntable is mounted is provisionally fixed to the chassis, and when the path of the optical axis of the objective lens of the pickup is brought into alignment with the radial direction of the turntable, a mounting screw is tightened to finally fix the spindle motor to the chassis.

Conventionally, the centering of the pickup of a player has been carried out in the above-described manner, and therefore when the spindle motor is to be finally fixed to the chassis by tightening the mounting screw, the spindle motor is displaced with respect to the chassis, so that the center of the pickup is shifted.

Therefore, disadvantages are encountered in that the centering of the pickup is cumbersome and a lot of time is required for the adjustment operation.

SUMMARY OF THE INVENTION

The present invention has been made to overcome the abovementioned difficulties, and provides a pickup adjusting mechanism which is capable of easily adjusting the inclination of the pickup in the tracking and/or tangential directions without changing the height of the pickup. Further, the present invention provides a mechanism which is capable of adjusting the centering of the pickup easily and precisely.

The mechanism for adjusting the position of a pickup of a player, provided in accordance with one aspect of the present invention, includes a slider adapted to be driven for movement along a path extending in the radial direction of a turntable, the slider having a projection serving as the origin of angular movement. The projection is disposed in a first plane which extends in the direction of the rotational axis of the turntable and includes the path extending in the radial direction. The mechanism further includes an adjustment plate having the pickup mounted thereon, the adjustment plate being mounted on the slider; and a plurality of urging means for urging a lower surface of the adjustment plate against the projection, the urging means connecting the adjustment plate to the slider in such a manner that the optical axis of an objective lens of the pickup passes through the origin of angular movement. Also described is a tracking adjustment means mounted on the slider and disposed in the first plane, the tracking adjustment means being operable to angularly move the adjustment plate about a straight line disposed in a second plane disposed perpendicular to the first plane, so as to adjust the inclination of the pickup in a tracking direction; and a tangential adjustment means mounted on the slider and disposed in the second plane, the tangential adjustment means being operable to angularly move the adjustment plate about a straight line disposed in the first plane so as to adjust the inclination of the pickup in a tangential direction.

In the inventive mechanism for adjusting the position of a pickup of a player, the adjustment plate is mounted on the slider in such a manner that the optical axis of the objective lens of the pickup passes through the origin of angular movement provided on the projection. With this arrangement, when the tracking adjustment means is adjusted, the pickup is angularly moved about the straight line in the second plane, and therefore the inclination in the tracking direction can be adjusted without changing the height of the pickup.

When the tangential adjustment means is adjusted, the pickup is angularly moved about the straight line in the first plane, and therefore the inclination in the tangential direction can be adjusted without changing the height of the pickup.

The mechanism for adjusting the position of a pickup of a player, provided in accordance with another aspect of the present invention, includes a slider adapted to be driven for movement in a radial direction of a turntable. The mechanism further includes an adjustment plate having the pickup mounted thereon, the adjustment plate being mounted on the slider in such a manner that the adjustment plate is movable in a direction perpendicular to the radial direction; and a plurality of urging means provided between the slider and the adjustment plate to urge the adjustment plate against one of a plurality of side walls of said slider disposed in the perpendicular direction. A centering adjustment means is also provided on the one side wall for moving the adjustment plate in the perpendicular direction to adjust the centering of the pickup.

In the inventive mechanism for adjusting the position of the pickup of a player, the adjustment plate is mounted on the slider in such a manner that the adjustment plate is movable in the direction perpendicular to the radial direction of the turntable. With this arrangement, when the centering adjustment means is adjusted, the adjustment plate is moved in the perpendicular direction, so that the centering of the pickup can be adjusted.

DETAILED DESCRIPTION OF THE PREFERRED EMBODIMENT

Figure 1:
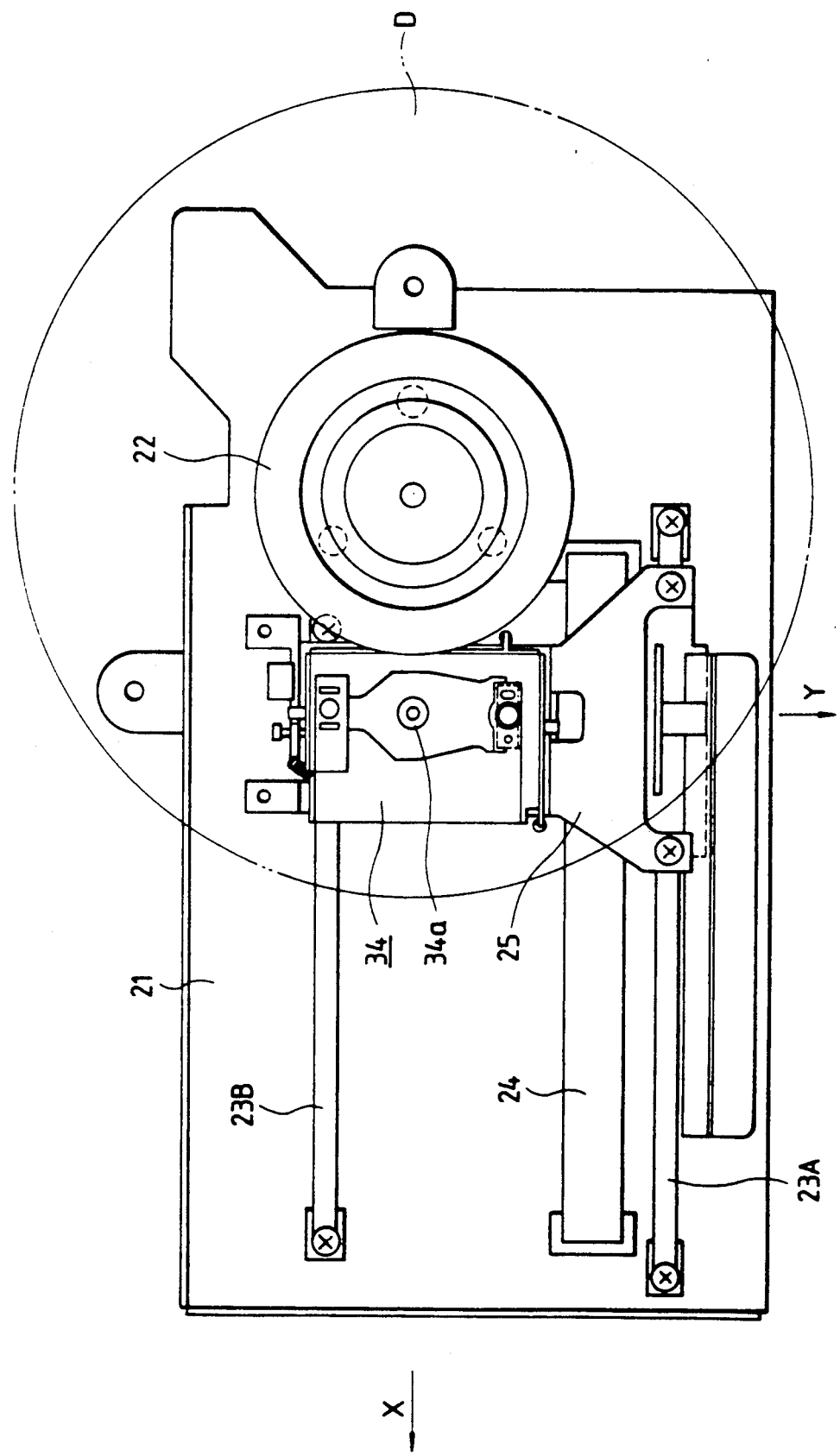
FIG. 1 is a plan view of a mechanism for adjusting the inclination and the centering of a pickup of a player, which constitutes a preferred embodiment of the present invention.

A preferred embodiment of the present invention will now be described with reference to the drawings. In FIGS. 1 to 5, a turntable 22 is mounted on a rotatable spindle of a spindle motor (not shown) mounted on a chassis 21, a disc D being adapted to be placed on the turntable 22.

First and second guide shafts 23A and 23B are mounted on the chassis 21 and extend parallel to the radial direction (i.e., X-axis direction) of the turntable 22. The first guide shaft 23A is disposed on the drive side, and the second guide shaft 23B is disposed on the driven side.

A linear motor 24 is mounted on the chassis 21 for driving a slider 25 (described later).

The slider 25 is connected at a portion thereof to a drive core of the linear motor 24, and is driven by the linear motor 24 for movement along the first and second guide shafts 23A and 23B in the X-axis direction. The slider includes a bottom wall $25a$, and first and second upstanding, opposed side walls $25b$ and $25c$ disposed respectively close to the first and second guide shafts 23A and 23B and extending in the X-axis direction.

A projection $25a_1$ is formed on the upper surface of the bottom wall $25a$, and is disposed in a first plane which includes the X-axis and extends in the axial direction of the turntable 22. This projection serves as the origin of angular movement of an adjustment plate 29 (described later).

A first threaded hole $25a_2$ is formed through the bottom wall $25a$, and is disposed in the first plane. A first adjustment screw 26 for adjusting the inclination of a pickup 34 (described later) in the tracking direction is threaded into the first threaded hole $25a_2$. A second threaded hole $25a_3$ is formed through the bottom wall $25a$, and is disposed in a second plane which perpendicularly intersects the first plane and includes the Y-axis. A second adjustment screw 27 for adjusting the inclination of the pickup 34 in the tangential direction is threaded into the second threaded hole $25a_3$. An opening $25a_4$ is formed through the bottom wall $25a$ for adjusting the height of the pickup 34. Also formed on the bottom wall $25a$ are first through third retainer portions $25a_5$–$25a_7$ which retain one end of first through third tension springs 33A–33C (described later), respectively.

Formed in the first side wall $25b$ is a first groove $25b_1$ which guides a third pin $29c_1$, formed on the adjustment plate 29, in the upward and downward directions and also in the Y-axis direction. Formed in the second side wall $25c$ is a second groove $25c_1$ which guides a fourth pin $29d_1$, formed on the adjustment plate 29, in the upward and downward directions and also in the Y-axis direction. The pins $29c_1$, and $29d_1$, along with the grooves $25b_1$, and $25c_1$, serve as guide means. A third threaded hole $25c_2$ is also formed through the second side wall $25c$, and a third adjustment screw 28 for moving the adjustment plate 29 in the Y-axis direction to adjust the centering of the pickup 34 is threaded into the third threaded hole $25c_2$.

The first adjustment screw 26 is threaded into the first threaded hole $25a_2$ formed through the bottom wall $25a$ of the slider 25, and serves to adjust the inclination of the pickup 34 in the tracking direction.

The second adjustment screw 27 is threaded into the second threaded hole $25a_3$ formed through the bottom wall $25a$ of the slider 25, and serves to adjust the inclination of the pickup 34 in the tangential direction.

The third adjustment screw 28 is threaded into the third threaded hole $25c_2$ formed through the second side wall $25c$ of the slider 25, and serves to move the adjustment plate 29 in the Y-axis direction so as to adjust the centering of the pickup 34.

The adjustment plate 29 is placed in a plane in which the distal end of the projection $25a_1$, formed on the bottom wall $25a$ of the slider 25, and the distal ends of the first and second adjustment screws 26 and 27 lie. The adjustment plate 29 includes a bottom wall $29a$, a downwardly-directed engaging portion $29b$ formed on one side edge of the bottom wall $29a$ and extending in the Y-axis direction, a pair of first and second upwardly-directed, opposing side walls $29c$ and $29d$ extending in the X-axis direction and disposed respectively close to the first and second guide shafts 23A and 23B, and a third upwardly-directed side wall $29e$ formed on the side edge of the bottom plate opposite to the engaging portion $29a$ and extending in the Y-axis direction.

The bottom wall $29a$ has a hole $29a_1$ through which a threaded portion of a fourth adjustment screw 32 (described later) extends, a first pin $29a_2$ which passes through a first hole $30b$ formed through a holder 30 (described later), and a second pin $29a_3$ for preventing the rotation of the holder 30. The first side wall $29c$ has the third pin $29c_1$ which is engaged in and guided by the first groove $25b_1$ formed in the first side wall $25b$ of the slider 25, and a first retainer portion $29c_2$ which is provided at a position corresponding to the first retainer portion $25a_5$ on the bottom wall $25a$ of the slider 25 and retains the other end of the first tension spring 33A (see especially FIG. 3).

The second side wall $29d$ has the fourth pin $29d_1$ which is engaged in and guided by the second groove $25c_1$ formed in the second side wall $25c$ of the slider 25, and a second retainer portion $29d_2$ which is provided at a position corresponding to the second retainer portion $25a_6$ on the bottom wall $25a$ of the slider 25 and retains the other end of the second tension spring 33B. The third side wall $29e$ has a third retainer portion $29e_1$ provided at a position corresponding to the third retainer portion $25a_7$ formed on the bottom wall $25a$ of the slider 25.

The holder 30 includes a pickup mounting portion $30a$ on which the pickup 34 is mounted by a screw in a properly positioned manner, the first hole $30b$ through which the first pin $29a_2$ of the adjustment plate 29 is passed, a groove $30c$ in which the second pin $29a_3$ of the adjustment plate 29 is engaged, and a threaded hole $30d$ into which the threaded portion of the fourth adjustment screw 32 is threaded.

A coil spring 31 has a coiled portion through which the first pin $29a_2$ of the adjustment plate 29 is passed, and one end of the coil spring is retained by the second pin $29a_3$ of the adjustment plate 29, while the other end is retained by a portion of the holder 30. The coil spring 31 urges the holder 30 to be angularly moved about the first pin $29a_2$ in a clockwise direction when viewed from above, so as to hold the second pin $29a_3$ against the edge of the groove $30c$ in the holder 30 without rattling (see FIG. 4). The coil spring 31 also serves to urge the holder 30 upwardly away from the adjustment plate 29.

The head of the fourth adjustment screw 32 is held against the lower surface of the adjustment plate 29, and the threaded portion of the screw extends through the hole $29a_1$ formed through the adjustment plate 29, and is threaded into the threaded hole $30d$ in the holder 30.

The first through third tension springs 33A-33C extend respectively between the first through third retainer portions $25a_5$-$25a_7$ of the slider 25 and the first through third retainer portions $29c_2$, $29d_2$ and $29e_1$ of the adjustment plate 29. These tension springs urge the adjustment plate 29 toward the turntable 22 and toward the chassis 21 relative to the slider 25.

Therefore, under the bias of the first through third tension springs 33A-33C, the adjustment plate 29 is urged toward the turntable 22 and toward the plane in which the distal end of the projection $25a_1$ on the bottom wall $25a$ of the slider as well as the distal ends of the first and second adjustment screws 26 and 27 lie (see FIG. 5), and also toward the third adjustment screw 28, to prevent the adjustment plate 29 from rattling.

The pickup 34 is mounted on the pickup mounting portion $30a$ of the holder 30, and an objective lens $34a$ is mounted on the upper side of the pickup 34, the objective lens $34a$ being driven for upward and downward movement.

FIGS. 6(a) and 6(b), 7(a) and 7(b) and 8(a) and 8(b) are views respectively explanatory of the adjustment of the height of the pickup, the adjustments of the inclinations of the pickup in the tracking and tangential directions and the centering of the pickup.

The operation will now be described.

Figure 6A:
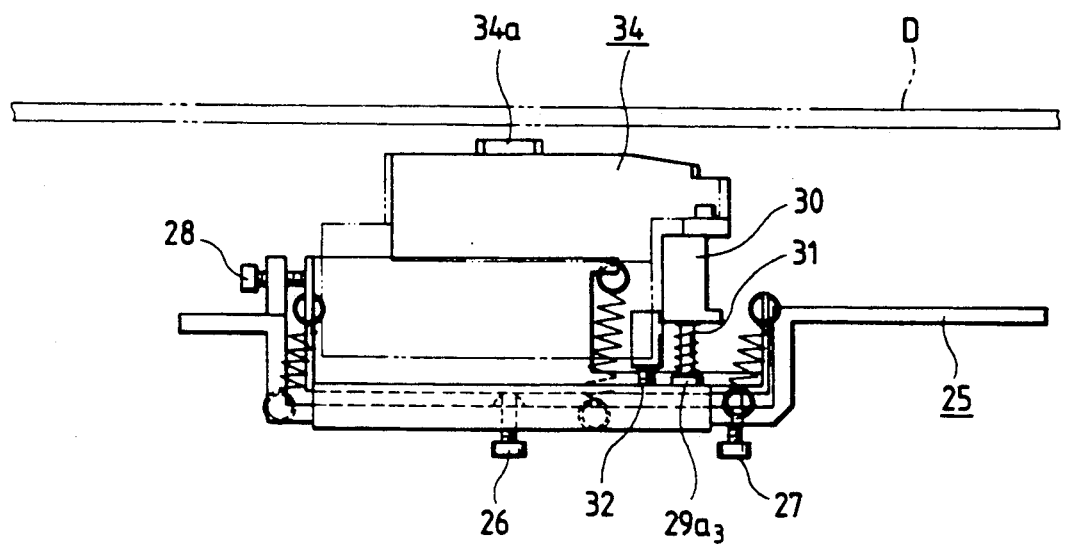
FIGS. 6(a) and 6(b) are explanatory views illustrating the adjustment of the height of the pickup.
Figure 6B:
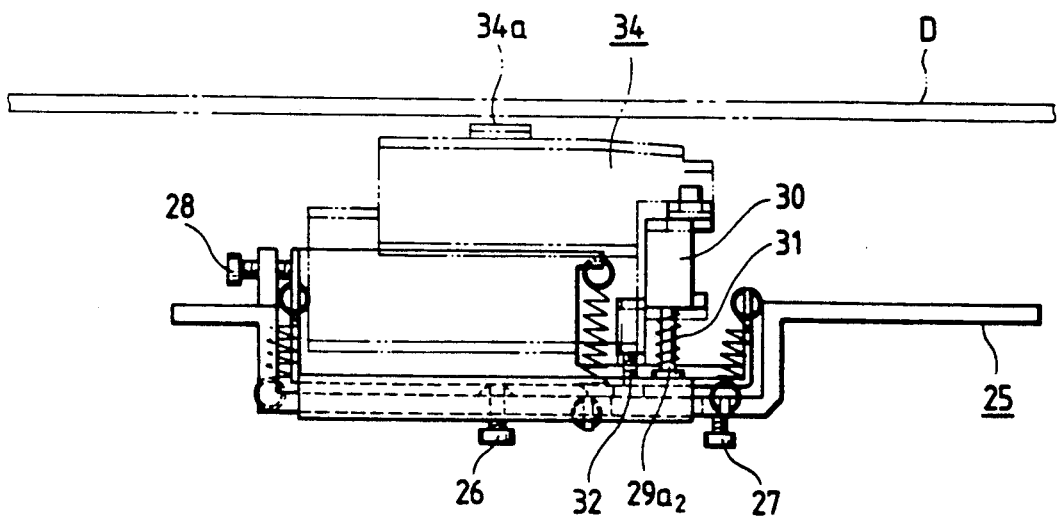

First, in the condition shown in FIG. 6(a), when the height of the pickup 34 (that is, the spacing between the objective lens $34a$ and the disc D) is to be adjusted, the fourth adjustment screw 32 is loosened, so that the holder 30 moves upward under the bias of the coil spring 31 while being guided by the first and second pins $29a_2$ and $29a_3$. As a result, the height of the pickup 34 can be adjusted as shown in FIG. 6(b).

Thus, by turning the fourth adjustment screw 32, the holder 30 can be moved upward or downward, and therefore the height of the pickup 34 can be easily adjusted precisely by the fourth adjustment screw 32.

Figure 7A:
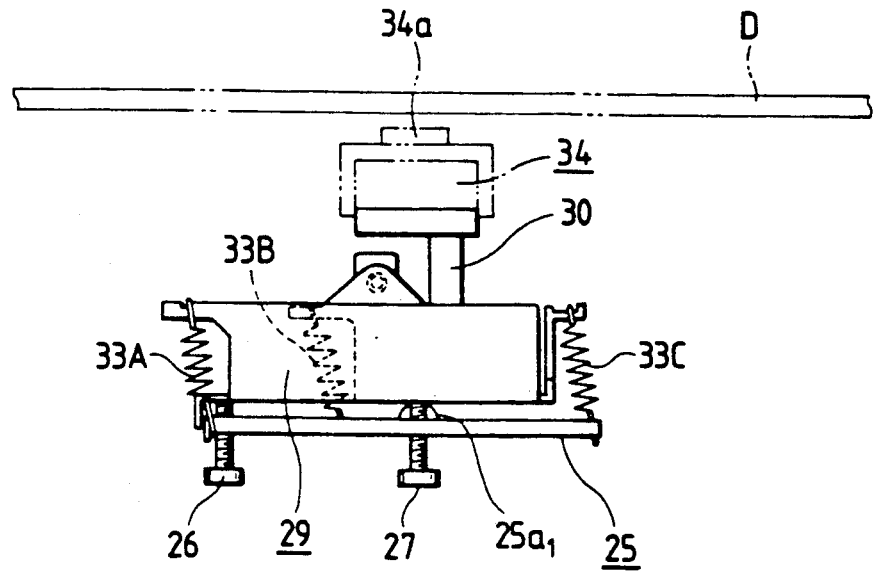
FIGS. 7(a) and 7(b) are explanatory views illustrating the adjustment of the inclination in a tracking direction.
Figure 7B:
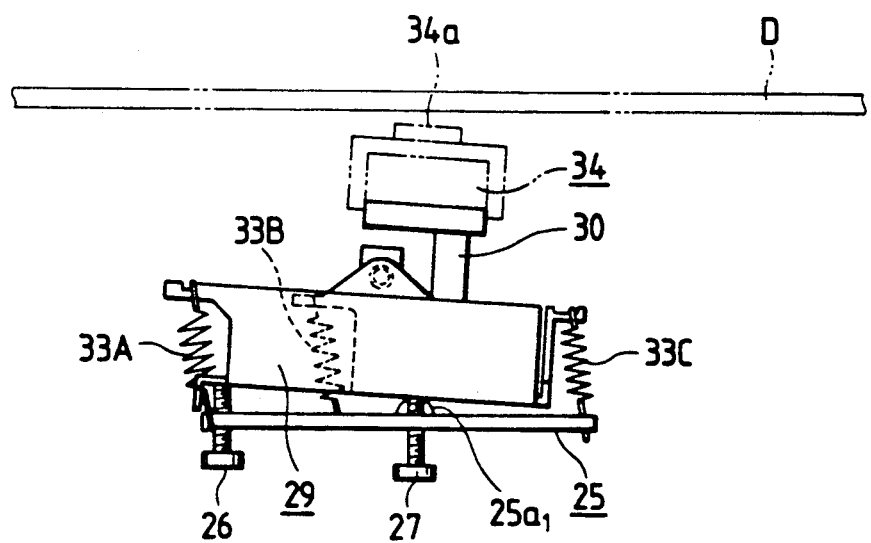

Next, in the condition shown in FIG. 7(a) in which the adjustment of the height of the pickup 34 is completed as described above, when the inclination of the pickup 34 in the tracking direction is to be adjusted, the first adjustment screw 26 is tightened to raise part of the adjustment plate 29, so that the adjustment plate 29 is angularly moved clockwise about the third and fourth pins $29c_1$ and $29d_1$ against the bias of the first through third tension springs 33A-33C. As a result, the pickup can be inclined in the tracking direction toward the inner periphery of the disc D, as shown in FIG. 7(b).

When the adjustment plate 29 is angularly moved, the third and fourth pins $29c_1$ and $29d_1$ are guided respectively in the planes in which the side walls respectively having the first and second grooves $25b_1$ and $25c_1$ lie.

Thus, by turning the first adjustment screw 26, the adjustment plate 29 is angularly moved about the third and fourth pins $29c_1$ and $29d_1$, and therefore the inclination in the tracking direction can be easily adjusted by the first adjustment screw 26 without changing the height of the pickup 34.

Figure 8A:
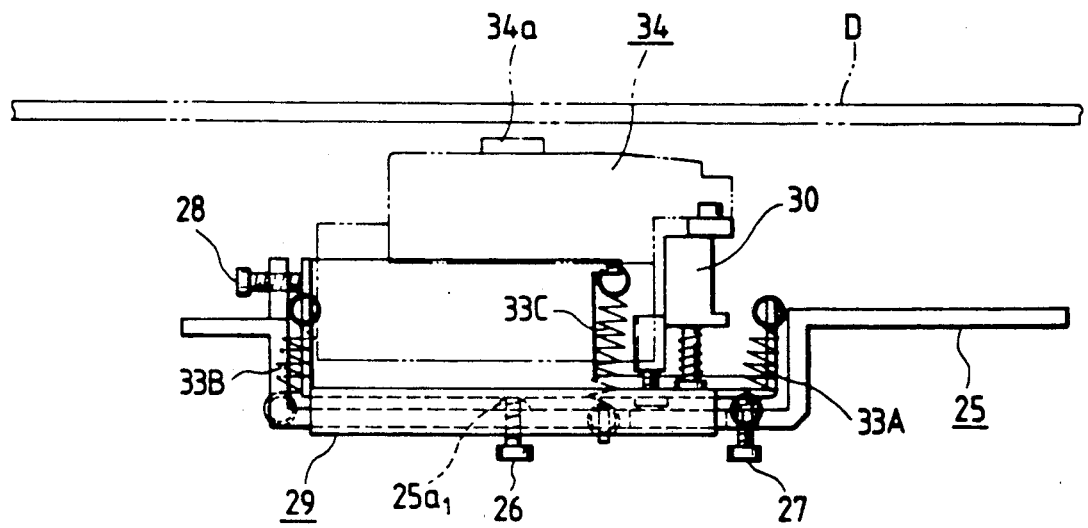
FIGS. 8(a) and 8(b) are explanatory views illustrating the adjustment of the inclination in a tangential direction.
Figure 8B:
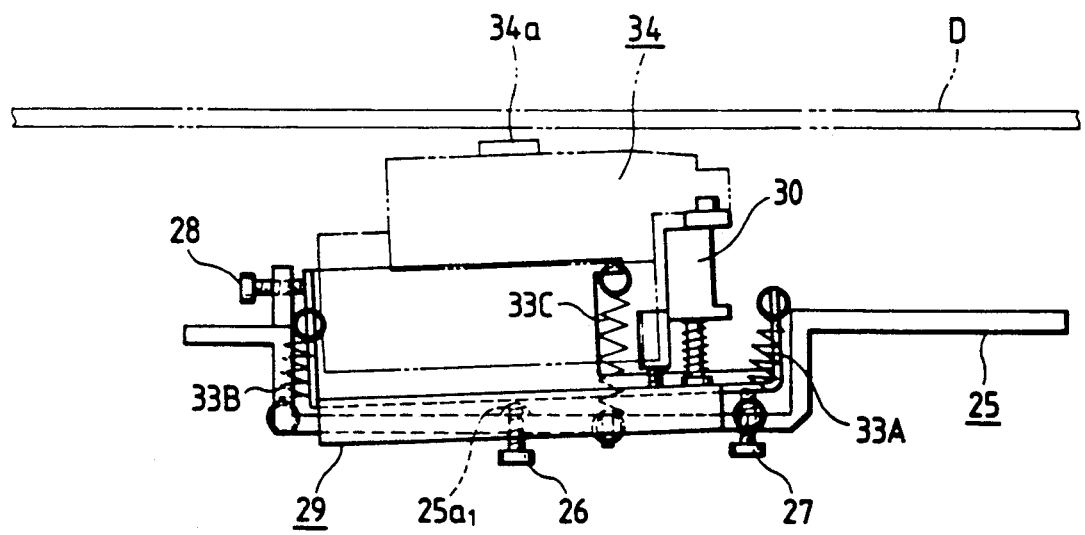
Figure 9:
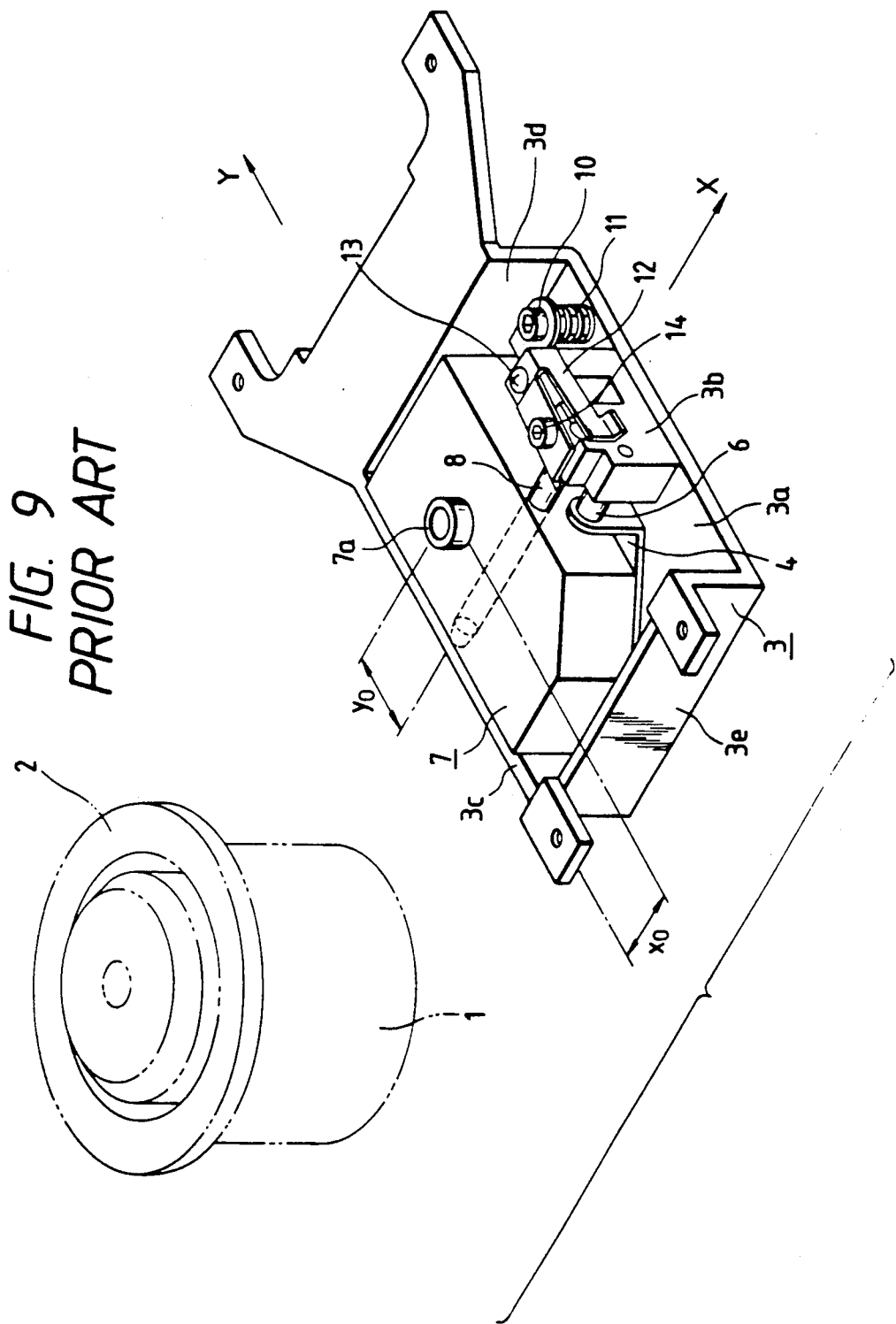
FIG. 9 is a perspective view of a conventional mechanism for adjusting the inclination of a pickup of a player.
Figure 10:
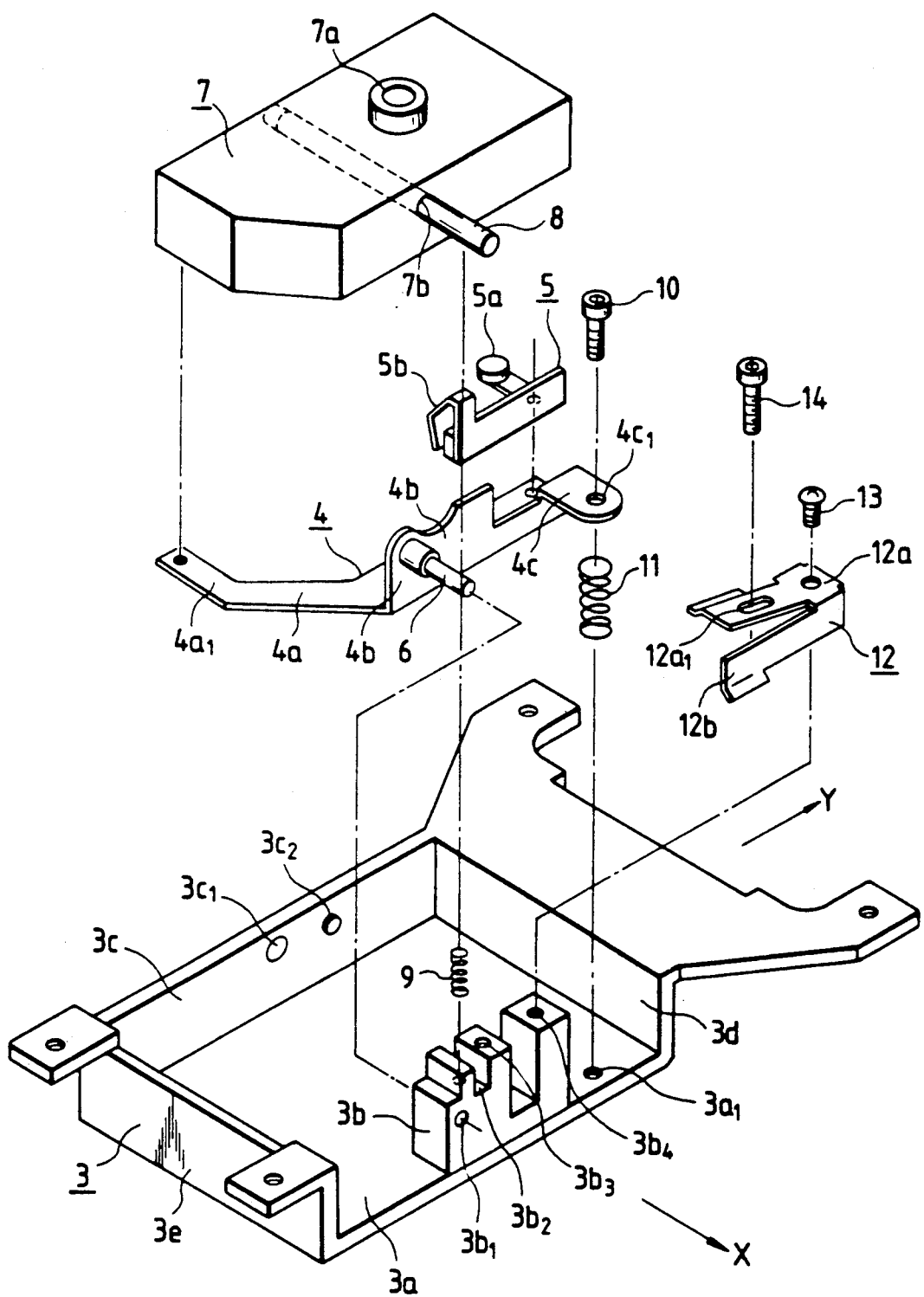
FIG. 10 is an exploded perspective view of the mechanism of FIG. 9.

Next, in the condition shown in FIG. 8(a) in which the adjustment of the height of the pickup 34 as well as the adjustment of the inclination in the tracking direction is completed as described, when the inclination in the tangential direction is to be adjusted, the second adjustment screw 27 is tightened to raise part of the adjustment plate 29. As a result, the adjustment plate 29 is angularly moved counterclockwise about a straight line parallel to the X-axis against the bias of the first through third tension springs 33A-33C. Thus, the pickup is inclined in the tangential direction toward the left side of the disc D, as shown in FIG. 8(b).

Thus, by angularly moving the second adjustment screw 27, the adjustment plate 29 is angularly moved about the straight line parallel to the X-axis, and therefore the inclination in the tangential direction can be easily adjusted by the second adjustment screw 27 without changing the height of the pickup 34.

Figure 2:
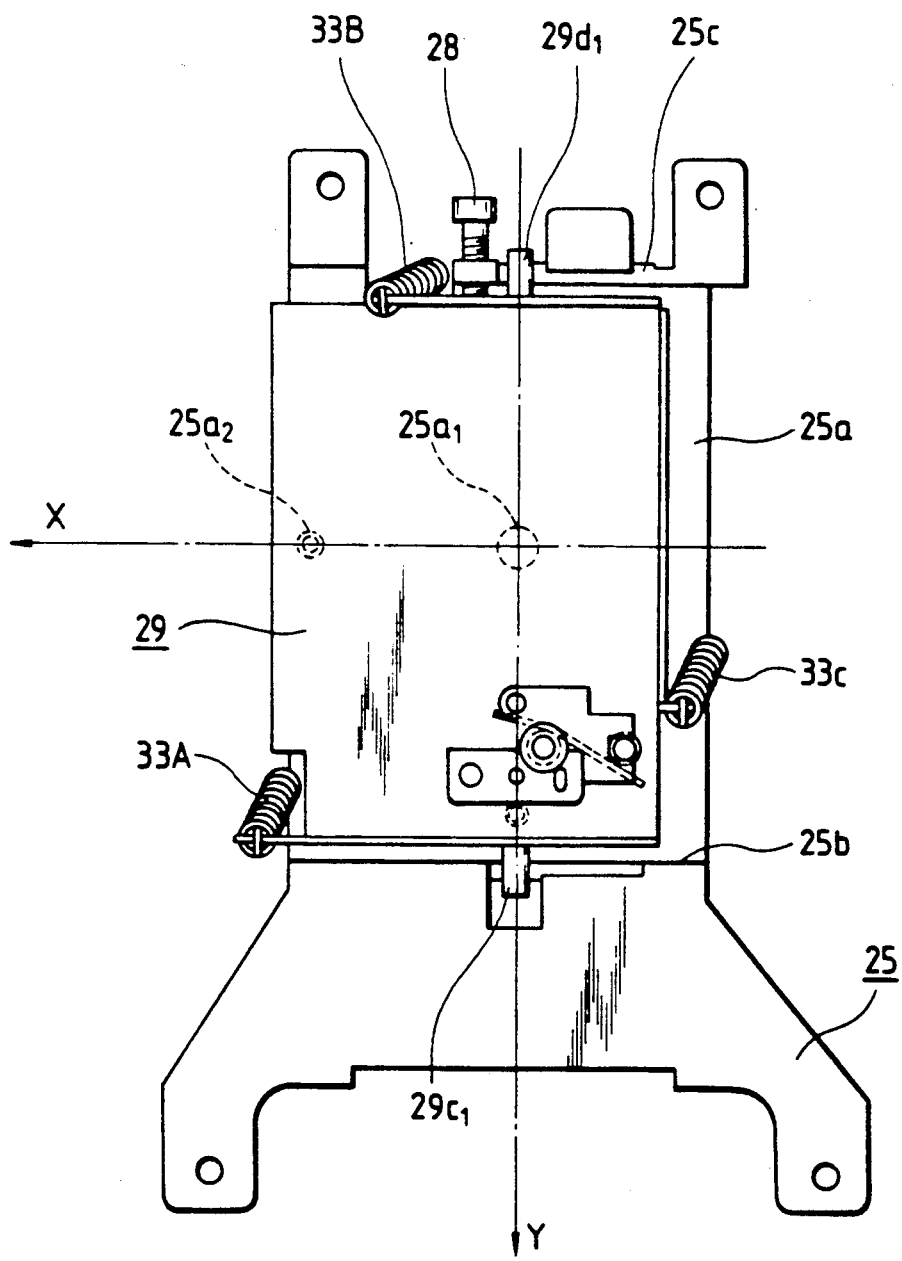
FIG. 2 is an enlarged plan view showing a slider and an adjustment plate, with the pickup removed.
Figure 3:
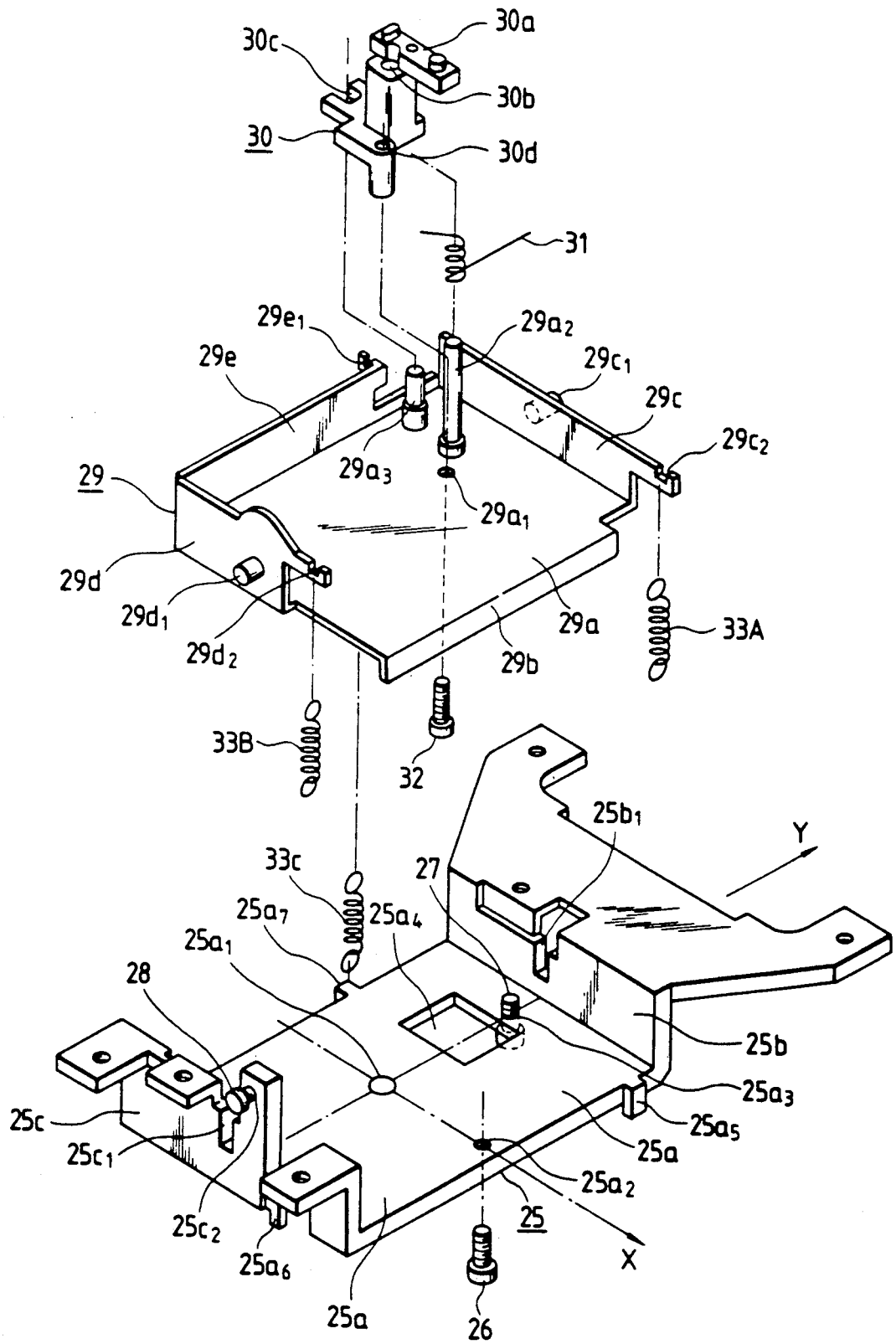
FIG. 3 is an exploded, perspective view of the components of FIG. 2.
Figure 4:
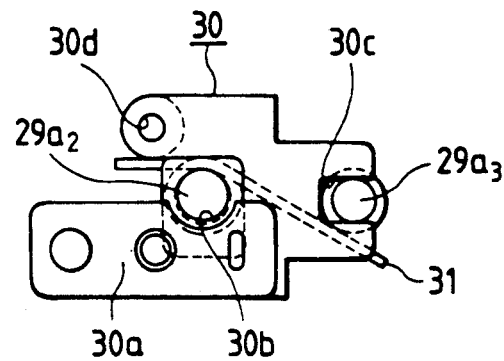
FIG. 4 is an enlarged plan view showing a pickup height-adjusting mechanism.
Figure 5:
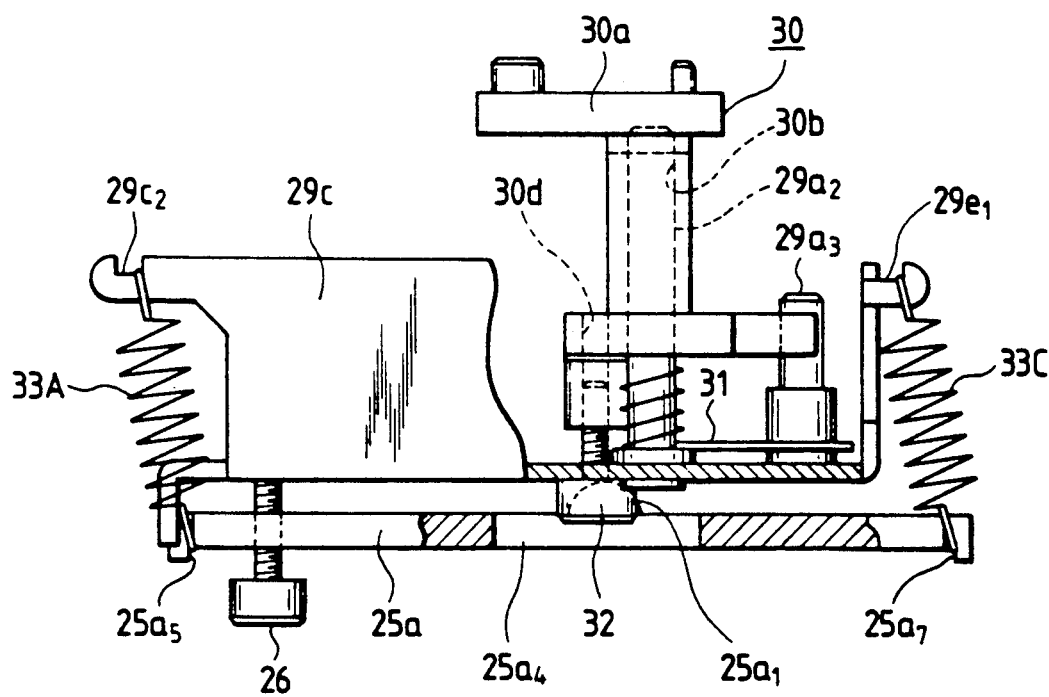
FIG. 5 is a partially-broken, enlarged side-elevational view of the pickup height-adjusting mechanism.

Next, in the condition in which the adjustment of the height of the pickup 34, as well as the adjustments of the inclinations in the tracking and tangential directions are completed as described above, when the centering of the pickup 34 is to be adjusted, the third adjustment screw 28 is tightened to push the adjustment plate 29 toward the lower side of FIGS. 1 and 2. As a result, the adjustment plate 29 moves against the bias of the first through third tension springs 33A-33C toward the lower side of FIGS. 1 and 2 in the plane in which the distal ends of the projection $25a$ and the first and second adjustment screws 26 and 27 lie, while being guided by the third and fourth pins $29c_1$ and $29d_1$ engaged respectively in the first and second grooves $25b_1$ and $25c_1$.

Thus, by angularly moving the third adjustment screw 28, the adjustment plate 29 can be moved in the Y-axis direction, and therefore the centering of the pickup 34 can be adjusted easily and precisely by the third adjustment screw 28.

When the centering of the pickup 34 is completed, the optical axis of the objective lens $34a$ is disposed to pass through the projection $25a_1$ serving as the origin of angular movement.

In the above embodiment, by angularly moving the first and second adjustment screws 26 and 27, the inclinations in the tracking and tangential directions can be adjusted easily and precisely without changing the height of the pickup 34.

By angularly moving the third adjustment screw 28, the adjustment plate 29 can be moved in the Y-axis direction, so that the centering of the pickup 34 can be effected easily and precisely.

When the inclinations of the pickup 34 in the tracking direction and the tangential direction are adjusted, the center of the pickup 34 is shifted. Therefore, the centering of the pickup 34 is finally adjusted.

In the above embodiment, although the projection $25a_2$, serving as the origin of the angular movement of the adjustment plate 29, is provided on the slider 25, it may be replaced by any other means capable of serving as the origin of the angular movement like the projection 25a₂, such as, for example, a distal end of a screw threadedly connected to the slider 25.

As described above, in the present invention, the projection serving as the origin of angular movement is provided on the slider and is disposed in the plane in which the rotational axis of the turntable lies, and the adjustment plate is mounted on the slider in such a manner that the optical axis of the objective lens of the pickup passes through the origin of angular movement. The tracking adjustment means for adjusting the inclination of the pickup in the tracking direction, as well as the tangential adjustment means for adjusting the inclination of the pickup in the tangential direction, are provided on the slider. With this construction, since the height of the pickup is not changed even when the tracking adjustment means and the tangential adjustment means are adjusted, the inclinations in the tracking and tangential directions can be adjusted easily and precisely. In addition, one of the height, the inclination in the tracking direction and the inclination in the tangential direction can be easily adjusted without changing the other two.

When the inclination in the tangential direction is adjusted, the center of the pickup is shifted. However, there is achieved an advantage in that, by moving the adjustment plate in the plane constituted by the projection, the tracking adjustment means and the tangential adjustment means, the centering can be easily adjusted with very little change to the height of the pickup.

Furthermore, the adjustment plate is mounted on the slider in such a manner that the adjustment plate is movable in a direction perpendicular to the radial direction of the turntable. Also, there is provided the pickup centering adjustment means for moving the adjustment plate relative to the slider in the perpendicular direction. With this construction, there can be achieved an advantage that when the centering adjustment means is adjusted, the adjustment plate is moved in the perpendicular direction, so that the centering of the pickup can be adjusted easily and precisely.

What is claimed is:

1. A mechanism for adjusting the position of a pickup in a player, the player including a turntable, said mechanism comprising:
   a slider adapted to be driven for movement along a path extending in the radial direction of said turntable, said slider having a projection serving as an origin of angular movement, said projection having a portion disposed in a first plane which extends in the direction of the rotational axis of said turntable and which includes said path extending in the radial direction;
   an adjustment plate having the pickup mounted thereon, said adjustment plate being mounted on said slider;
   a plurality of urging means urging a lower surface of said adjustment plate against said projection, said urging means connecting said adjustment plate to said slider in such a manner that the optical axis of an objective lens of the pickup passes through said origin of angular movement;
   tracking adjustment means mounted on said slider and having a portion disposed in said first plane, said tracking adjustment means being operable to angularly move said adjustment plate about a straight line disposed perpendicular to said first plane and passing through said origin, so as to adjust the inclination of the pickup in a tracking direction; and
   tangential adjustment means mounted on said slider, said tangential adjustment being operable to angularly move said adjustment plate about a straight line disposed in said first plane and intersecting at said origin said straight line disposed perpendicular to said first plane, so as to adjust the inclination of the pickup in a tangential direction, whereby adjustment in said tracking direction does not interact with adjustment in said tangential direction and vice versa.

2. A mechanism for adjusting the position of a pickup according to claim 1, wherein said plurality of urging means comprise a plurality of tension springs extending between said slider and said adjustment plate.

3. A mechanism for adjusting the position of a pickup according to claim 1, wherein said adjustment plate is positioned in a plane defined by a distal end of said projection formed on a bottom wall of said slider, and the distal ends of first and second adjustment screws which are threaded through first and second threaded holes, respectively, formed through said bottom wall.

4. A mechanism for adjusting the position of a pickup according to claim 3, wherein said tangential adjustment means includes said second adjustment screw, such that upon turning of said second adjustment screw, said adjustment plate is angularly moved to incline said pickup in said tangential direction.

5. A mechanism for adjusting the position of a pickup according to claim 1, wherein said adjustment plate includes first and second opposing side walls, each side wall having a pin extending from an outer surface thereof for engagement with corresponding grooves formed in said slider.

6. A mechanism for adjusting the position of a pickup according to claim 5, wherein said tracking adjustment means includes a first adjustment screw, such that upon turning said first adjustment screw, said adjustment plate is angularly moved about said pins.

7. A mechanism for adjusting the position of a pickup in a player, the player including a turntable, said mechanism comprising:
   a slider adapted to be driven for movement in a radial direction of said turntable;
   an adjustment plate having the pickup mounted thereon, said adjustment plate being mounted on said slider in such a manner that said adjustment plate is movable in a direction perpendicular to said radial direction;
   a plurality of urging means provided between said slider and said adjustment plate to urge said adjustment plate toward a corresponding one of a plurality of side walls of said slider;
   centering adjustment means provided on said corresponding one of said plurality of side walls for moving said adjustment plate in said perpendicular direction to adjust the centering of the pickup; and
   guide means for guiding said adjustment plate on said slider in said perpendicular direction without affecting inclination of said adjustment plate in a tracking direction and/or a tangential direction.

8. A mechanism for adjusting the position of a pickup according to claim 7, wherein said centering adjustment means includes an adjustment screw threaded into a threaded hole formed through said corresponding one of said plurality of side walls of said slider for engagement with said adjustment plate.

9. A mechanism for adjusting the position of a pickup in a disc player, the pickup having an objective lens and the disc player including a turntable, said mechanism comprising:
- a slider being movable along a path extending in the radial direction of said turntable, and having a projection which serves as an origin of angular movement;
- an adjustment plate having the pickup mounted thereon and being mounted on said slider such that said adjustment plate is movable in a direction perpendicular to the radial direction of said turntable;
- a plurality of urging means provided between said slider and said adjustment plate, said urging means urging said adjustment plate against a side wall portion of said slider and urging a bottom surface of said adjustment plate against said projection;
- tracking adjustment means mounted on said slider for angularly moving said adjustment plate so as to adjust the inclination of said pickup in a tracking direction;
- tangential adjustment means mounted on said slider for angularly moving said adjustment plate so as to adjust the inclination of said pickup in a tangential direction;
- centering adjustment means provided on said side wall portion of said slider for moving said adjustment plate in said perpendicular direction to adjust the centering of said pickup; and
- guide means for guiding said adjustment plate on said slider in said perpendicular direction without affecting the inclination of said adjustment plate in said tracking direction and/or said tangential direction.

* * * * *